United States Patent [19]

Marwitz et al.

[11] 4,421,783

[45] Dec. 20, 1983

[54] PROCESS FOR COATING SUBSTRATES

[75] Inventors: Heinrich Marwitz; Kurt Ullrich; Karl Huhn, all of Burghausen, Fed. Rep. of Germany

[73] Assignee: Wacker-Chemie GmbH, Munich, Fed. Rep. of Germany

[21] Appl. No.: 345,853

[22] Filed: Feb. 4, 1982

[30] Foreign Application Priority Data

Mar. 6, 1981 [DE] Fed. Rep. of Germany ....... 3108595

[51] Int. Cl.$^3$ ........................... B05D 3/06; B05D 3/02
[52] U.S. Cl. .................................. 427/54.1; 427/387; 427/389; 427/389.9; 427/391; 427/392; 427/393; 427/393.4; 427/393.6
[58] Field of Search ................ 525/478; 427/387, 391, 427/389.9, 389, 412, 392, 393.4, 393, 54.1, 393.6; 156/329

[56] References Cited

U.S. PATENT DOCUMENTS 4,154,714  5/1979  Hockemeyer et al. ......... 427/387 X
4,211,815  1/1980  Deiner .......................... 427/393.4 X
4,311,760  1/1982  Kalinowski et al. ......... 427/393.4 X

*Primary Examiner*—Thurman K. Page

[57] ABSTRACT

A process for coating a substrate which comprises coating the substrate with a solution containing an organic solvent and (1) a diorganopolysiloxane having terminal SiC-bonded vinyl groups,
(2) an organopolysiloxane having at least 3 Si-bonded hydrogen atoms per molecule,
(3) a catalyst which promotes the addition of Si-bonded hydrogen to an aliphatic multiple bond; and optionally
(4) an agent which delays or retards the addition of Si-bonded hydrogen to an aliphatic multiple bond at room temperature,
(5) a diorganopolysiloxane having a viscosity of at least $10^6$ mPa.s at 25° C. in which a vinyl group is bonded to a silicon atom in 0.033 to 3.33 percent of the diorganosiloxane units, while the other organic radicals in the diorganosiloxane units of the diorganopolysiloxane are free of aliphatic multiple bonds, and
(6) an organosilicon adhesive compound.

An acrylic acid ester polymer or copolymer (7) may be applied to the substrate simultaneously with or prior to the application of the solution containing components (1) through (6) above.

11 Claims, No Drawings

PROCESS FOR COATING SUBSTRATES

The present invention relates to a process for coating substrates and more particularly to a process for coating substrates with a solution containing an organic solvent and an organopolysiloxane to waterproof and to impart hydrophobic and abrasion resistant properties to the coated substrates.

BACKGROUND OF THE INVENTION

It is known that substrates, including woven and nonwoven fabrics made from natural or synthetic fibers may be treated with a solution containing organopolysiloxanes to impart hydrophobic properties thereto. For example, U.S. Pat. No. 4,154,714 to Hockemeyer et al. discloses coating cellulosic substrates with a composition containing a diorganopolysiloxane having terminal SiC-bonded vinyl groups, an organopolysiloxane containing at least 3 Si-bonded hydrogen atoms per molecule, a catalyst which promotes the addition of Si-bonded hydrogen to vinyl groups, and an organic solvent. In contrast to the coatings described in the above patent, the coated substrates of this invention are highly waterproofed, extremely hydrophobic, and highly resistant to abrasion. Moreover, all of these properties are preserved, even when the coated substrates are cleaned with water or with an organic solvent.

Therefore, it is an object of this invention to provide a process for coating substrates. Another object of this invention is to provide a process for preparing waterproofed substrates. Still another object of this invention is to provide a process for coating substrates to enhance their resistance to abrasion. A further object of this invention is to provide a process for treating substrates with a solution to impart hydrophobic properties to the treated substrates. A still further object of this invention is to provide a process for coating a substrate with a composition containing an organopolysiloxane which is capable of being crosslinked to form a coating thereon.

SUMMARY OF THE INVENTION

The foregoing objects and others which will become apparent from the following description are accomplished in accordance with this invention, generally speaking, by providing a process for coating a substrate which comprises treating the substrate with a solution containing an organic solvent and
(1) a diorganopolysiloxane having terminal SiC-bonded vinyl groups,
(2) an organopolysiloxane having at least 3 Si-bonded hydrogen atoms per molecule,
(3) a catalyst which promotes the addition of Si-bonded hydrogen to an aliphatic multiple bond, and optionally
(4) an agent which delays or retards the addition at room temperature,
(5) a diorganopolysiloxane having a viscosity of at least $10^6$ mPa.s at 25° C., in which a vinyl group is bonded to a silicon atom in 0.033 to 3.33 percent of the diorganosiloxane units, while the other organic radicals in the diorganosiloxane units of the diorganopolysiloxane are free of aliphatic multiple bonds, and
(6) an organosilicon adhesive compound and thereafter crosslinking the coated substrate.
An acrylic acid ester polymer or copolymer (7) may be applied to the substrate simultaneously with or prior to the application of the solution containing components (1) through (6) above.

DETAILED DESCRIPTION OF THE INVENTION

Any substrate which has been or could have been coated with a composition containing a diorganopolysiloxane having terminal SiC-bonded vinyl groups, an organopolysiloxane containing at least 3 Si-bonded hydrogen atoms per molecule, and a catalyst which promotes the addition of Si-bonded hydrogen to an aliphatic multiple bond, and an organic solvent may be coated with the process of this invention. Examples of substrates which may be coated with the process of this invention are textiles containing natural or synthetic fibers, paper, cardboard, including asbestos board, as well as wood and cork. The paper may consist of low-grade types of paper, such as absorbent paper, or better grade paper, such as wood-free paper.

Examples of textile fibers which may be treated with the process of this invention are keratin, cotton, rayon, hemp, natural silk, polypropylene, polyethylene, polyester, polyurethane, polyamide, cellulose-acetate, and mixtures of such fibers. The fibers may be present in the form of fleeces, mats, fabrics, knitted textiles, including articles of clothing or parts of articles of clothing. When the compositions of this invention are applied to fabrics which are tightly woven from fine filament yarn, for example, fine polyamide taffeta, an excellent waterproofed fabric is obtained.

Examples of organic solvents which may be used in the process of this invention are especially ethyl acetate, isobutanol and alkane mixtures having a boiling range between 135° and 180° C. at 1013 mbar (abs.) as well as hydrocarbons other than alkanes, such as benzene, toluene and xylene, halogenated alkanes having from 1 to 6 carbon atoms per molecule, such as methylene chloride, trichloroethylene, and perchlorethylene, ethers, such as di-n-butyl ether, and ketones, such as methylethyl ketone, and cyclohexanone, as well as mixtures of two or more such solvents, such as mixtures of ethyl acetate and isobutanol.

It is preferred that the amount of solvent employed range from about 50 to 80 percent by weight, based on the total weight of the solution. The higher the proportion of solvent in relation to the total weight of the solution used, the higher the aqueous steam permeability and the elasticity of the coating. A high degree of aqueous steam permeability may, for example, be desirable in manufacturing work clothing.

The diorganopolysiloxanes (1) having terminal SiC-bonded vinyl groups are preferably of the type which can be represented by the general formula:

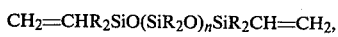

$CH_2=CHR_2SiO(SiR_2O)_nSiR_2CH=CH_2,$ in which R represents the same or different hydrocarbon radicals or substituted hydrocarbon radicals which are substantially free of aliphatic multiple bonds, and n is an integer having a value of at least 10.

Although this is generally not shown in formulas such as above, siloxane units other then the diorganosiloxane units ($SiR_2O$), may be present within or along the organopolysiloxane chain. Examples of such other siloxane units which are generally present only as impurities are especially those having the formulas $RSiO_{3/2}$, $R_3SiO_{1/2}$, and $SiO_{4/2}$, where R is the same as above. Such other siloxane units should preferably not exceed about one mole percent in the molecules of the diorganopolysiloxane (1).

Examples of SiC-bonded organic radicals other than the SiC-bonded vinyl groups in the diorganopolysiloxanes (1), which are represented by R above, are alkyl radicals, such as the methyl, ethyl, n-propyl, and the isopropyl radicals, as well as the butyl, octyl, tetradecyl and octadecyl radicals; cycloaliphatic hydrocarbon radicals, such as the cyclopentyl and cyclohexyl radicals, as well as methylcyclohexyl radicals; aryl radicals, such as the phenyl radical; alkaryl radicals, such as the tolyl radicals, and aralkyl radicals, such as the benzyl and the beta-phenylethyl radical. Examples of substituted hydrocarbon radicals are halogenated hydrocarbon radicals, such as the 3,3,3-trifluoropropyl radical, and o-, p-, and m-chlorophenyl radicals; and cyanoalkyl radicals, such as the cyanoethyl radical. Because they are readily available, it is preferred that at least 90 percent of the number of the SiC-bonded organic radicals which are free of aliphatic multiple bonds of the diorganopolysiloxanes (1), be methyl radicals.

The diorganopolysiloxanes (1) may consist of identical copolymers, or they may consist of mixtures of several copolymers, having the same degree of polymerization, or mixtures of the same or different copolymers having the same or different degrees of polymerization. When the diorganopolysiloxanes (1) contain different diorganosiloxane units, then the different units may be present in a random distribution, or they may be present in the form of block copolymers.

It is preferred that the diorganopolysiloxanes (1) have an average viscosity of from about 1000 to 30,000 mPa.s at 25° C., and more preferably from about 15,000 to 25,000 mPa.s at 25° C.

It is preferred that diorganopolysiloxanes (1) be used in an amount of from about 0.5 to about 6 percent by weight, based on the total weight of the solution.

The same linear or cyclic organopolysiloxanes (2) having at least 3 Si-bonded hydrogen atoms per molecule, which have been or could have been used heretofore in the processes for preparing coatings consisting of an organopolysiloxane having vinyl groups, an organopolysiloxane having at least 3 Si-bonded hydrogen atoms per molecule, and a catalyst which promotes the addition of Si-bonded hydrogen to an aliphatic multiple bond, may be used in the process of this invention.

In the organopolysiloxanes (2), which have at least 3 Si-bonded hydrogen atoms per molecule, the silicon valences which are not saturated by hydrogen and siloxane oxygen atoms, and preferably saturated by methyl, ethyl, or phenyl radicals, or a mixture containing at least two such radicals.

The organopolysiloxanes (2) having at least 3 Si-bonded hydrogen atoms per molecule may be represented by the following general formula:

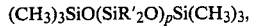

$(CH_3)_3SiO(SiR'_2O)_pSi(CH_3)_3,$ where R' represents hydrogen or the same or different radicals, such as the methyl, ethyl, or phenyl radicals, and p represents an integer having a value of from about 10 to about 500, with the proviso that only one hydrogen atom may be bonded to a silicon atom, and the ratio of $R'_2SiO$ units in which both R'(s) are hydrocarbon radicals, to HR'SiO units in which R' is a hydrocarbon radical, must be between 3:1 and 1:3. It is preferred that R' also be methyl, when it is not hydrogen.

The same or different types of molecules of organopolysiloxanes (2) havng at least 3 Si-bonded hydrogen atoms per molecule, may be used in the process of this invention.

The organopolysiloxanes (2), having at least 3 Si-bonded hydrogen atoms per molecule, is preferably employed in an amount of from about 0.4 to 4 percent by weight, based on the total weight of the solution.

The organopolysiloxanes (2) having at least 3 Si-bonded hydrogen atoms per molecule should preferably contain at least 0.1 percent by weight of Si-bonded hydrogen for each molecule of this type of organopolysiloxane.

Any of the catalysts which have been or could have been used heretofore for promoting the addition of Si-bonded hydrogen to an aliphatic multiple bond may be used as catalysts (3) for promoting the addition of Si-bonded hydrogen to an aliphatic multiple bond in the process of this invention. Examples of such catalysts are metallic and finely dispersed platinum, ruthenium, rhodium, palladium, and iridium, in which these metals may be present on solid carriers, such as silicon dioxide, aluminum oxide, or activated carbon. Compounds or complexes of these elements, such as $PtCl_4$, $H_2PtCl_6.6H_2O$, $Na_2PtCl_4.4H_2O$, platinum-olefin complexes, platinum-alcohol or platinum-alcoholate complexes, platinum-ether complexes, platinum-aldehyde complexes, platinum-ketone complexes, including reaction products of $H_2PtCl_6.6H_2O$ and cyclohexanone, platinum-vinylsiloxane complexes, especially platinum-divinyltetramethyldisiloxane complexes, which contain or are free of any detectable inorganically bonded halogen, bis-(gamma-picoline)-platinum dichloride, trimethylene pyridine platinum dichloride, dicyclopentadiene platinum dichloride, and dimethylsulfoxide-ethylene platinum-(II)-dichloride, as well as a reaction product of platinum tetrachloride dissolved in 1-octene and sec.-butylamine may be used as catalysts (3) in the process of this invention.

Platinum compounds or platinum complexes, are the preferred catalysts (3) to promote the addition of Si-bonded hydrogen to aliphatic multiple bonds.

It is possible to use only one type of catalyst (3) to promote the addition of Si-bonded hydrogen to aliphatic multiple bonds, or a mixture of two or more such catalysts may be employed.

If a platinum compound or a platinum complex is used as the catalyst (3) to promote the addition of Si-bonded hydrogen to aliphatic multiple bonds, the catalyst is preferably used in an amount of from about 0.0005 to about 0.003 percent by weight, calculated as elemental platinum and based on the total weight of the solution. Preferably, the platinum compound or complex is diluted with a diluent to a concentration of about 1 percent by weight calculated as elemental platinum based on the weight of the diluent before it is employed in the process of this invention.

In order to enhance the stability of the compositions used in the process of this invention, which contain an organopolysiloxane having SiC-bonded vinyl groups as well as an organopolysiloxane having Si-bonded hydrogen and a catalyst which promotes the addition of Si-bonded hydrogen to aliphatic multiple bonds, it is preferred that these compositions contain at least one agent (4) which delays or retards the addition of Si-bonded hydrogen to aliphatic multiple bonds. Examples of such agents are acetylenic alcohols, such as ethinylcyclohexanol, and 2-methyl-3-butin-2-ol; 1,3-divinyl-1,1,3,3-tetramethyldisiloxane, and trichloroethylene.

When an acetylenic alcohol is used as agent (4) to delay or retard the addition of Si-bonded hydrogen to aliphatic multiple bonds, then it is preferably employed in an amount of from about 0.02 to 0.4 percent by weight, based on the total weight of the solution.

The diorganopolysiloxane (5) having a viscosity of at least $10^6$ mPa.s at 25° C. in which 0.033 to 3.33 percent of the diorganosiloxane units have a vinyl group bonded to the silicon atom and the other organic radicals in the diorganosiloxane units of the diorganopolysiloxanes are free of aliphatic multiple bonds, may be represented by the following general formula:

$$A_aR_{3-a}SiO[Si(CH=CH_2)RO]_n(SiR_2O)_mSiR_{3-a}A_a,$$

in which R is the same as above, A represents a hydroxyl or a vinyl group; a is 0 or 1, and m and n are integers, where the ratio of m:n is 30:1 to 3000:1.

Here again, siloxane units other than the units having the formulas $SiR_2O$ and $Si(CH=CH_2)RO$ may be present within or along the organopolysiloxane chain. Examples of such other siloxane units which may be present as impurities are those having the formulas $RSiO_{3/2}$, $R_3SiO_{1/2}$, and $SiO_{4/2}$, where R is the same as above. It is preferred that such other siloxane units not exceed about one mole percent in the molecules of diorganopolysiloxane (5).

The examples of substituted and unsubstituted hydrocarbon radicals represented by R in diorganopolysiloxanes (1) are equally applicable to the organic radicals in the diorganopolysiloxane (5) which are free of aliphatic multiple bonds. It is preferred that at least 90 percent of the number of organic radicals represented by R which are free of aliphatic multiple bonds in diorganopolysiloxane (5), be methyl radicals.

It is preferred that the ratio of m:n be between 100:1 and 300:1, so that from 0.33 to 1 percent of the diorganosiloxane units in diorganopolysiloxane (5) be a vinyl group which is bonded to the silicon atom as an organic radical, while the other organic radicals in the diorganosiloxane units of the diorganopolysiloxanes are free of aliphatic multiple bonds.

The diorganopolysiloxane (5) may consist of either identical copolymers, or mixtures of different copolymers having the same degree of polymerization, or they may consist of mixtures of the same or different copolymers having different degrees of polymerization. The different diorganosiloxane units of the diorganopolysiloxane (5) may be present in a random distribution, or in the form of block copolymers.

It is preferred that the diorganopolysiloxane (5) be used in an amount of from about 4 to 36 percent by weight, based on the total weight of the solution.

Examples of organosilicon compounds (6) which constitute suitable adhesives are silanes containing hydrolyzable radicals, and vinyl, acryloxy, methacryloxy, epoxy, or amino groups, partial hydrolysates of such silanes, and reaction products of vinyltriacetoxysilane, and a silane having the formula:

Reaction products of this type are preferred.

A single organosilicon compound which constitutes a suitable adhesive, or a mixture containing two or more of such organosilicon compounds may be employed.

It is preferred that the organosilicon compound (6) which constitutes a suitable adhesive be employed in an amount of from 0.2 to 2 percent by weight, based on the total weight of the solution.

It is preferred that the organopolysiloxane solution containing Si-bonded vinyl groups be stored separately from the organopolysiloxane solution containing Si-bonded hydrogen, in order to prevent premature crosslinking.

The acrylic acid ester polymers or copolymers (7) which may be applied to the substrate prior to or simultaneously with the application of the solution containing constituents (1) through (6), may be either crosslinkable or non-crosslinkable. Any type of acrylic acid ester polymer or copolymer may be used in the process of this invention. Also, these polymers or copolymers are preferably soluble in the organic solvent.

The coating compositions of this invention may contain constituents in addition to those described heretofore. Examples of such other constituents are fillers and pigments.

The coating compositions of this invention may be applied to the substrate by any method which is suitable for applying a liquid composition to a substrate, such as for example, by immersion, coating, pouring, spraying, calendering, imprinting, coating with the aid of a doctor blade, including a Meyer rod, or with the aid of an airbrush.

The organopolysiloxane composition is then crosslinked, preferably at temperatures of at least 110° C., in order that the organic solvent or mixture of organic solvents may simultaneously be evaporated. Temperatures of from about 140° C. to about 160° C. for from 5 to 180 seconds are preferred. Crosslinking can also be achieved with ultraviolet light or a combination of heat and ultraviolet light.

A polyamide taffeta weighing 60 g/m², need only be coated with about 10 g/m² of dry coating in order to achieve excellent resistance to water penetration.

The coatings of this invention may be used to treat work clothes, as well as for coating rainwear and sportswear.

A mixture containing a platinum complex and a diluent, which was used in the following examples, was prepared as follows:

About 20 parts of sodium bicarbonate were added to a mixture consisting of 10 parts by weight of $H_2PtCl_6.6H_2O$, 20 parts by weight of 1,3-divinyl-1,1,3,3-tetramethyldisiloxane, and 50 parts by weight of ethanol. The mixture was agitated and heated for 30 minutes under reflux and then allowed to stand for 15 hours. It was then filtered and the volatile components were distilled from the filtrate at about 16 mbar. The residue was dissolved in benzene and the solution filtered and the benzene distilled from the filtrate. The residue was then dissolved in a vinylmethylsiloxy terminated dimethylpolysiloxane having a viscosity of 1000 mPa.s at 25° C., in such an amount that the solution contained 1 percent by weight of elemental platinum.

In the following examples, all parts and percentages are by weight, unless otherwise specified.

EXAMPLE 1

A solution consisting of:

(a) 17.0 parts of a trimethylsiloxy terminated diorganopolysiloxane consisting of 99.5 mole percent of dimethylsiloxane units and 0.5 mole percent of vinylmethylsiloxane units and having a viscosity in excess of $10^6$ mPa.s at 25° C. (A Brabender plastograph value of 5100 J, at 25° C. and at 60 rpm). (A Brabender plastograph is illustrated, in K. Frank "Prüfingsbuch für Kautschuk," Stuttgart, 1955, page 25.);

(b) 8.5 parts of a trimethylsiloxy terminated diorganopolysiloxane consisting of 99.95 mole percent of dimethylsiloxane units, and 0.05 mole percent of vinylmethylsiloxane units and having a viscosity in excess of $10^6$ mPa.s at 25° C. (A Brabender plastograph value of 7160 J, at 25° C. and at 60 rpm);

(c) 4.5 parts of a vinyldimethylsiloxy terminated dimethylpolysiloxane having a viscosity of 20,000 mPa.s at 25° C.;

(d) 2.8 parts of trimethylsiloxy end-blocked organopolysiloxane which consists of 75 mole percent of dimethylsiloxane units, and 25 mole percent of methylhydrogen siloxane units and having a viscosity of 130 mPa.s at 25° C.;

(e) 0.9 part of an organosilicon adhesive compound, obtained by heating a mixture consisting of 10 g of vinyltriacetoxysilane and 13 g of a silane having the formula:

for one hour at 200° C.;

(f) 0.2 part of the mixture containing the platinum complex and the diluent prepared above, and (g) 0.1 part of ethinylcyclohexanol, and (h) 66.0 parts of an alkane mixture having a boiling range between 135° and 180° C. at 1013 mbar (abs.)

is applied twice to a tightly woven polyamide taffeta (filament fabric) weighing 60 g/m² with the aid of a doctor blade. After each application, the fabric is heated for 45 seconds to 150° C. The fabric contains 11 g/m² of coating.

The aqueous steam permeability of the coated fabric is 239 g/dm² as determined in accordance with DIN (German Industrial Standard) 53,122.

The water-proofing factor of the coated fabric is 1000 mm as determined in accordance with DIN 53,886. After 5 washings at 30° C. in a household automatic washer, or after being treated 5 times for 20 minutes each time with perchloroethylene containing 1 g/liter of a detergency-reinforcing agent, and 2 g/liter of water, the water-proofing factor remained unchanged.

Even after the coated fabric had been exposed for 8 days to saturated aqueous steam at 90° C., no decrease could be observed in the coating's resistance to abrasion.

EXAMPLE 2

A tightly woven polyamide taffeta (filament fabric) weighing 60 g/m² is first coated with a 50 percent solution of a crosslinkable resin based on a polyacrylic acid ethyl ester (available as "Plexisol ®BV 396,": Röhm GmbH) in a mixture of ethyl acetate and isobutanol in a weight ration of 7 parts of ester to 3 parts of alcohol and then the fabric is coated with the solution described in Example 1. Both solutions are applied with the aid of a doctor blade. Following each application, the fabric is heated for 45 seconds to 150° C. The fabric contains 16 g/m² of coating.

The aqueous steam permeability of the coated fabric is 185 g/dm² as determined in accordance with DIN 53,122.

The water-proofing factor of the coated fabric is 1000 mm as determined in accordance with DIN 53,886. After the fabric has been treated 5 times and for 20 minutes each time with perchloroethylene containing the additives mentioned in Example 1, the waterproofing properties of the fabric are unchanged.

Even after the coated fabric has been exposed to a saturated aqueous steam for 8 days at 90° C., no decrease could be observed in the coating's resistance to abrasion.

EXAMPLE 3

With the aid of a doctor blade, a tightly woven polyamide taffeta (filament fabric) weighing 60 g/m² is coated with a mixture consisting of equal parts of the solution described in Example 2, which consists of a crosslinkable resin based on a polyacrylic acid ethyl ester, and the solution described in Example 1. After the coating has been applied, the fabric is heated for 45 seconds to 150° C. The fabric contains 8 g/m² of coating.

The water-proofing factor of the coated fabric is 1000 mm as determined in accordance with DIN 53,886. After 3 washings at 30° C. in an automatic household washer, or three 10-minute treatments with perchloroethylene containing the additives in Example 1, the water-proofing factor remains essentially unchanged.

Even after the coated fabric has been exposed to a saturated aqueous steam at 90° C. for 8 days, there is no evidence of any decrease in the coating's resistance to abrasion.

EXAMPLE 4

The process described in Example 1 is repeated, except that a polyester filament fabric weighing 70 g/m² is substituted for the polyamide taffeta. The fabric contains 17 g/m² of coating.

The water-proofing factor of the coated fabric is 1000 mm as determined in accordance with DIN 53,886. After 5 washings at 30° C. in an automatic washer, or five 10-minute treatments with perchloroethylene containing the additives described in Example 1, the factor was essentially unchanged.

Even after the coated fabric has been exposed for 8 days to saturated aqueous steam at 90° C., no decrease in the coating's resistance to abrasion could be observed.

EXAMPLE 5

A solution consisting of:

(a) 14.3 parts of a trimethylsiloxy terminated diorganopolysiloxane consisting of 99.5 mole percent of dimethylsiloxane units and 0.5 mole percent of vinylmethylsiloxane units, and having a plasticity of 5100 J as determined by a Brabender plastograph at 25° C. and at 60 rpm;

(b) 7.1 parts of a trimethylsiloxy terminated diorganopolysiloxane consisting of 99.95 mole percent of dimethylsiloxane units and 0.05 mole percent of vinylmethylsiloxane units and having a plasticity of 7160 J, as determined by Brabender plastograph at 25° C. and at 60 rpm;

(c) 3.8 parts of a vinyldimethylsiloxy terminated dimethylpolysiloxane having a viscosity of 20,000 mPa.s at 25° C.;

(d) 2.3 parts of a trimethylsiloxy end-blocked diorganopolysiloxane which consists of 75 mole percent dimethylsiloxane units and 25 mole perent methylhydrogensiloxane units, and has a viscosity of 130 mPa.s at 25° C.;

(e) 0.8 parts of an organosilicon adhesive compound whose preparation is described in Example 1;

(f) 0.2 part of the mixture containing the platinum complex and the diluent described above;

(g) 0.1 part ethinylcyclohexanol, and (h) 71.4 parts of an alkane mixture having a boiling range of from 135° to 180° C. at 1013 mbar (abs.);
was applied with the aid of a doctor blade to a cotton/polyester fabric (50/50 mixture) weighing 220 g/m², of the type used in the manufacture of work clothes. The fabric was then heated to 150° C. for 45 seconds. The fabric contains 25 g/m² of coating.

The coated fabric exhibits good air-permeability.

The water-proofing factor of the coated fabric was 250 mm as determined in accordance with DIN 53,886. After 5 washings at 30° C. in an automatic washer, or after five 10-minute treatments with perchloroethylene, the water-proofing factor was still 200 mm as determined in accordance with DIN 53,886.

What is claimed is:

1. A process for coating a substrate, which comprises coating the substrate with a composition containing
    (1) a diorganopolysiloxane having terminal SiC-bonded vinyl groups,
    (2) an organopolysiloxane having at least 3 Si-bonded hydrogen atoms per molecule,
    (3) a catalyst which promotes the addition of Si-bonded hydrogen to an aliphatic multiple bond,
    (5) a diorganopolysiloxane having a viscosity of at least $10^6$ mPa.s at 25° C., in which a vinyl group is bonded to the silicon atom in 0.033 to 3.33 percent of the diorganosiloxane units, while the remaining organic radicals in the diorganosiloxane units of the diorganopolysiloxane are free of aliphatic multiple bonds,
    (6) an organosilicon adhesive compound which promotes adhesion and an organic solvent and thereafter cross-linking the coated substrate.

2. The process of claim 1, wherein a polymeric acrylic acid ester is applied to the substrate simultaneously with the composition containing components (1), (2), (3), (5), (6) and organic solvent.

3. The process of claim 1, wherein a polymeric acrylic acid ester is applied to the substrate prior to the application of the composition containing components (1), (2), (3), (5), (6) and organic solvent.

4. The process of claim 1, 2 or 3, wherein the composition contains an agent (4) which delays or retards the addition of Si-bonded hydrogen to an aliphatic multiple bond.

5. The process of claim 1, 2 or 3, wherein from 0.33 to 1 percent of the diorganosiloxane units in the diorganopolysiloxane (5), has a vinyl group bonded to the silicon atom as an organic radical, and the remaining organic radicals in the diorganosiloxane units are free of aliphatic multiple bonds.

6. The process of claim 1, 2 or 3, wherein the diorganopolysiloxane (5) is present in an amount of from 4 to 36 percent by weight, based on the total weight of the solution.

7. The process of claim 1, 2 or 3, wherein the organosilicon adhesive compound (6) is obtained from the reaction of a vinyltriacetoxysilane, and a silane of formula:

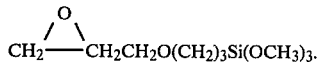

8. The process of claim 1, 2 or 3, wherein the coated substrate is crosslinked at an elevated temperature.

9. The process of claim 1, wherein the organic solvent is removed and the coated substrate is cross-linked.

10. The process of claim 9, wherein the coated substrate is cross-linked at a temprature of at least 110° C.

11. The process of claim 1, wherein the coated substrate is cross-linked with ultraviolet light.

* * * * *